(12) United States Patent  (10) Patent No.: US 6,350,197 B1
Cooksey et al.  (45) Date of Patent: Feb. 26, 2002

(54) OFFSET AUGER FEED FOR A COMBINE CLEAN GRAIN ELEVATOR

(75) Inventors: William L. Cooksey, Geneseo; Robert A. Matousek, Milan, both of IL (US); Daniel Reints, Davenport, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/502,665

(22) Filed: Feb. 11, 2000

(51) Int. Cl.⁷ .............................................. A01D 12/46
(52) U.S. Cl. ...................................... 460/114; 460/119
(58) Field of Search ................................ 198/666, 668, 198/671; 209/257; 460/114, 119, 146; 56/16.6; 414/505

(56) References Cited

U.S. PATENT DOCUMENTS

| 363,953 A | 5/1887 | Alexis-Godillot |
| 409,089 A | 8/1889 | Wilson |
| 1,382,901 A | 6/1921 | Gebhardt |
| 1,704,731 A | 3/1929 | Eggert |
| 1,767,248 A | 6/1930 | Leach |
| 2,433,162 A | 12/1947 | Scranton et al. |
| 2,467,790 A | 4/1949 | Welty |
| 2,801,137 A | 7/1957 | Clay |
| 2,995,135 A | 8/1961 | Krum |
| 3,152,702 A | 10/1964 | Klemm et al. |
| 3,155,288 A | 11/1964 | Landgraf |
| 3,157,297 A | 11/1964 | Tweedale |
| 3,265,226 A | 8/1966 | Malcolm |
| 3,300,032 A | 1/1967 | Dion |
| 3,451,530 A | 6/1969 | Shumway |
| 3,482,577 A | * 12/1969 | De Pauw et al. ............. 460/13 |
| 3,616,800 A | 11/1971 | Rowland-Hill et al. |
| 3,669,291 A | 6/1972 | De Coene |
| 3,760,813 A | * 9/1973 | Mathews ..................... 460/119 |
| 4,015,734 A | 4/1977 | Laidig |
| 4,067,343 A | * 1/1978 | Muijs et al. ................... 460/16 |
| 4,386,695 A | 6/1983 | Olson |
| 4,408,947 A | * 10/1983 | Lenski et al. ................ 414/526 |
| 4,714,398 A | * 12/1987 | Rohwedder .................. 414/503 |
| 4,717,308 A | 1/1988 | Kuhns |
| 5,101,961 A | 4/1992 | Bengtson et al. |
| 5,145,461 A | 9/1992 | Tanis |
| 5,367,860 A | 11/1994 | Cullen |
| 5,443,352 A | 8/1995 | Schuhmacher |
| 5,863,247 A | 1/1999 | Behnke et al. |
| 6,102,795 A | * 8/2000 | Behrens ...................... 460/119 |

OTHER PUBLICATIONS

Excerpt from a Brochure for a Combine Manufactured by John Deer, No date.

* cited by examiner

Primary Examiner—Thomas B. Will
Assistant Examiner—Meredith C. Petravick
(74) Attorney, Agent, or Firm—Brinks Hofer Gilson & Lione

(57) ABSTRACT

An offset auger feed assembly for use with a grain harvesting combine. A grain elevator is used to lift the grain into a storage tank on the combine. The grain elevator encloses a plurality of paddles connected to a continuous chain. Sprockets located at the top and bottom of the grain elevator support the continuous chain. An auger trough is connected to the bottom of the grain elevator. An auger positioned in the auger trough feeds grain into the bottom of the grain elevator. The shaft of the auger is offset from lower sprocket that supports the continuous chain at the bottom of the grain elevator in such a manner that the lower sprocket and the continuous chain do not interfere with the flow of grain into bottom of the grain elevator.

40 Claims, 8 Drawing Sheets

OFFSET AUGER FEED FOR A COMBINE CLEAN GRAIN ELEVATOR

FIELD OF THE INVENTION

This invention relates generally to the field of harvesting combines and, in particular, to an improved apparatus for feeding grain to the clean grain elevator.

BACKGROUND OF THE INVENTION

Combines are used to harvest agricultural crops such as corn, soybeans, wheat and other grain crops. As the combine is driven through the crops, the combine cuts the crop, separates the desired crop from the undesired waste, stores the crop, and discards the waste.

In a typical combine, a head is mounted to the front of the combine to gather the crop and feed the crop into the combine for processing. As the combine is driven through the field, the crop material is collected by the head and deposited into a feeder housing. The crop material is then transported upwardly and into the combine by a feed elevator located within the feeder housing. The crop material then passes through a threshing and separating mechanism. In a rotary combine, the threshing and separating mechanism comprises a rotor, a threshing concave, a rotor cage, and a separating grate. As crop material passes between the rotor, the threshing concave and the separating grate, the crop material is impacted and/or rubbed, thereby causing the grain to separate from stalk material. The stalk material that is separated from the grain is called MOG (material other than grain).

After passing through the threshing and separating assembly, the grain and MOG are deposited on to a grain cleaning system. The grain cleaning system of a typical combine comprises a pair of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank.

The grain collecting auger comprises an axle or shaft about which a blade (called the auger flighting) is spirally positioned. As the collecting auger is rotated, the flighting moves the grain along the length of the auger and into the base or boot of the grain elevator. The grain elevator typically comprises a housing having a series of paddles attached to a continuous chain. The chain is connected between a pair of sprockets located inside the top and bottom, respectively, of the elevator housing. As the chain is driven, the grain collected in the boot of the elevator is lifted up through the elevator housing by the paddles. A separate auger then moves the grain from the top of the elevator housing into a storage tank on the combine.

In a typical combine, the lower sprocket of the grain elevator is supported on the shaft of the collecting auger. This arrangement has a number of disadvantages. For example, the grain that is fed into the elevator boot by the collecting auger must pass around the face of the elevator lower sprocket. The sprocket consequently obstructs and limits the flow of the grain into the elevator boot. The portion of the chain wrapped about the lower sprocket similarly obstructs the flow of grain. This arrangement also tends to disproportionately load grain onto the ends of the elevator paddles adjacent to the collecting auger trough, thereby limiting the amount of grain that can be raised up through the grain elevator by the paddles. In addition, both obstructions tend to damage grain flowing past them.

In addition, combines are being designed to harvest increasingly larger volumes of crop. These larger volume combines have correspondingly larger grain cleaning systems. In particular, the grain cleaning systems on these larger combines utilize longer cleaning sieves, and consequently, a longer grain collection panel. As the collection panel increases in length, the angle of the panel relative to the ground decreases, thereby inhibiting the flow of clean grain (under the influence of gravity) into the grain collection trough. Moreover, the increased volume of grain being collected necessarily requires a larger grain collection trough and auger. Increasing the size of these components further limits the angle of the collection panel, which must necessarily be positioned above the bottom of the collection trough.

Accordingly, it would be desirable to provide an apparatus for collecting the grain from beneath the grain cleaning system and moving the grain into the grain elevator that overcomes the disadvantages and limitations described above.

BRIEF SUMMARY OF THE INVENTION

The present invention provides an offset auger feed assembly for use with a grain harvesting combine. In particular, the offset auger feed assembly provides an improved apparatus for feeding grain into a grain elevator, which is used to lift the grain into a storage tank on the combine. The grain elevator encloses a plurality of paddles connected to a continuous chain. Sprockets located at the top and bottom of the grain elevator support the continuous chain. As the chain is driven, the paddles scoop-up and lift any grain that has been collected in the bottom of the grain elevator, commonly referred to as the boot.

The grain is fed into the boot by an auger assembly. The auger assembly comprises an auger trough connected to the boot. An auger is positioned in the auger trough. As the auger is rotated, any grain in the trough is moved along the trough and through an opening in the side of the boot. The shaft of the auger is offset from lower sprocket that supports the continuous chain at the bottom of the grain elevator. This offset permits the grain to be fed into the boot without having to pass around the lower sprocket or the continuous chain, both increasing capacity and reducing grain damage. The offset also permits the grain to fed more evenly along the entire length of the paddles, thereby increasing the volume of grain that can be lifted by the grain elevator.

Another aspect of the invention includes a tapered portion on the elevator boot. The tapered portion provides a transition area for the grain being fed into the boot by the auger. In particular, the tapered portion directs the flow of grain entering the boot from the auger trough towards the paddles, and insures that the grain is evenly distributed along the entire length of the paddles.

The preferred embodiment of the invention includes features in addition to those listed above. Moreover, the advantages over the current art discussed above are directly applicable to the preferred embodiment, but are not exclusive. The other features and advantages of the present invention will be further understood and appreciated when considered in relation to the detailed description of the preferred embodiment.

DETAILED DESCRIPTION OF THE INVENTION

Figure 1:
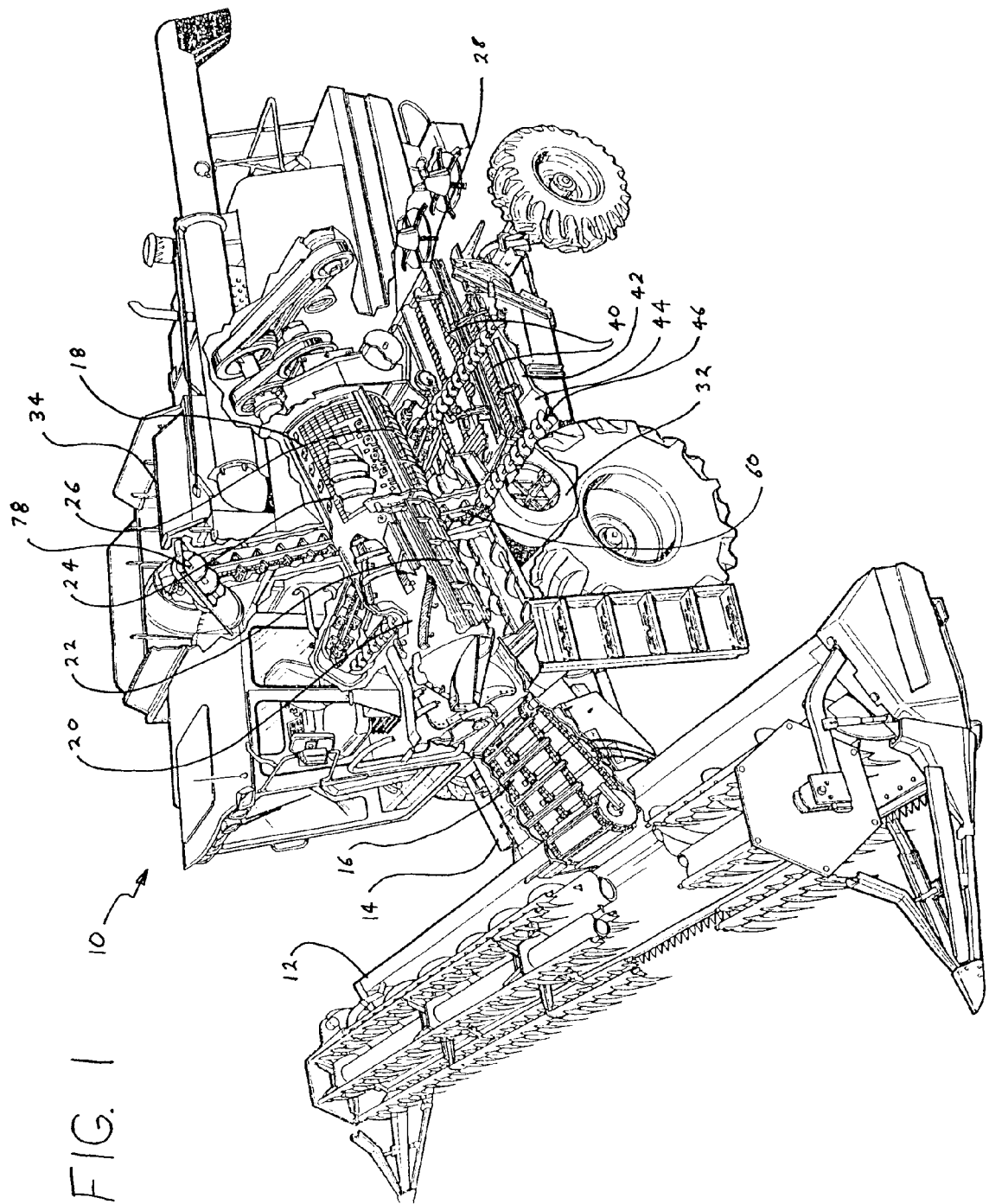
FIG. 1 is a perspective view of a combine on which the offset auger feed for a clean grain elevator of the present invention may be used.

While the present invention will possibly find application in several types of harvesting machinery, the preferred embodiment of the invention is described in conjunction with the combine 10 of FIG. 1. Only those aspects of the combine 10 that are pertinent to the present invention will be discussed in detail. In any event, non-essential aspects of the combine 10 are well known to those skilled in the art.

A head 12 is mounted to the front of the combine 10 to gather the crop and feed the crop into the combine 10 for processing. As the combine 10 is driven through the field, the crop material is collected by the head 12 and deposited into a feeder housing 14. The crop material is then transported upwardly and into the combine by a feed elevator assembly 16 located within the feeder housing 14. The crop material then passes through a threshing and separating assembly 18. In the rotary combine 10 of the preferred embodiment, the threshing and separating assembly 18 comprises a rotor 20, a threshing concave 22, a rotor cage 24, and a separating grate 26. As crop material passes between the rotor 20, the threshing concave 22 and the separating grate 26, the crop material is impacted and/or rubbed, thereby causing the grain to separate from stalk material (MOG).

After passing through the threshing and separating assembly 18, the grain and MOG are deposited on to a grain cleaning system 28. The grain cleaning system 28 of a typical combine comprises a pair of adjustable cleaning sieves 40, often referred to as a chaffer sieve and a shoe sieve. The cleaning sieves 40 are reciprocated back and forth in opposite directions along an arcuate path so as to separate the grain from the MOG. To further separate the grain from the MOG, a cleaning fan or blower 32 is positioned so as to blow air up through the cleaning sieves 40. This flow of air tends to blow the MOG rearwardly and out the back of the combine. The grain, on the other hand, drops through the openings in the cleaning sieves 40.

The clean grain that falls through the cleaning sieves 40 is deposited on a collection panel or plate 42 positioned beneath the cleaning sieves 40. The collection panel 42 is typically angled so as to permit the grain to flow towards the front of the collection panel 42 under the influence of gravity. The collection panel 42 may also be equipped with a shaker device (not shown) to assist in the movement of clean grain towards the front of the collection panel 42.

An auger trough 44 is positioned along the front of the lowermost edge of the collection panel 42 to collect the clean grain. The auger trough 44 has a semicircular cross-section. In the preferred embodiment shown, the cross-section of the auger trough 44 forms one half of a circle. The bottom of the auger trough 44 is positioned below the lowermost edge of the collection panel 42 so that the walls of the auger trough 44 retain the clean grain within the auger trough 44. The auger trough 44 typically extends along the full width of the collection panel 42.

Figure 2:
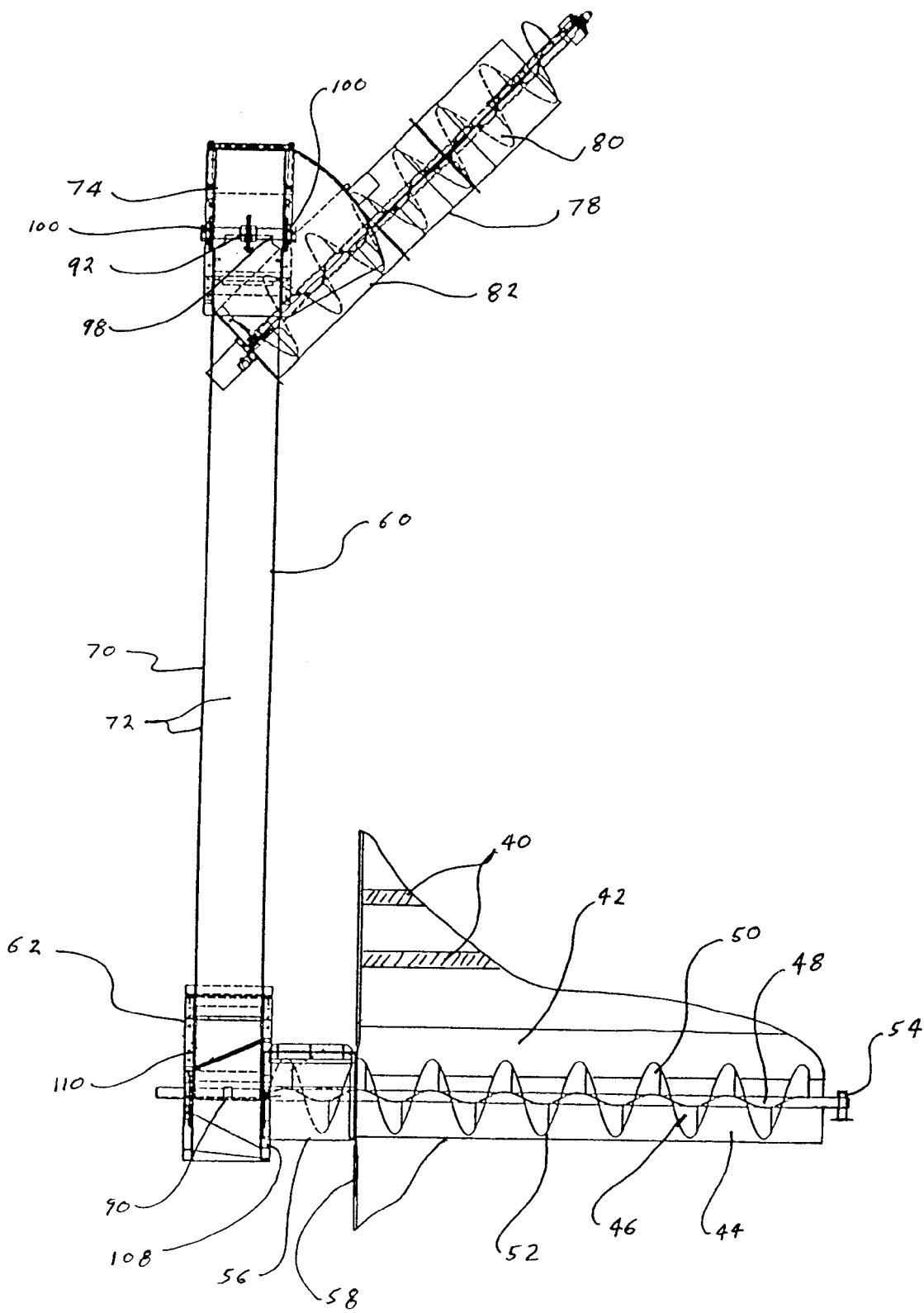
FIG. 2 is front view of a clean grain elevator and auger assembly on which the offset auger feed of the present invention may be used.

As best seen in FIG. 2, a collecting auger 46 is positioned in the auger trough 44. The collecting auger 46 comprises a central axis or shaft 48 about which the auger flighting 50 is connected. The auger flighting 50 consists of a blade that is spirally fastened to the length of the auger shaft 48. The radius of the collecting auger 46 is approximately equal to the radius of the auger trough 44 so that the exterior edge 52 of the auger flighting 50 is in close proximity to the interior surface of the auger trough 44. In the preferred embodiment shown, the auger shaft 48 is somewhat below the top of the auger trough 44. Each end of the auger shaft 48 is supported by a bracket 54 (see FIG. 3). The brackets 54 include bearings that permit the collecting auger 46 to rotate about the axis of the auger shaft 48.

Clean grain deposited in the auger trough 44 necessarily falls in between the blades of the auger flighting 50. As the auger shaft 48 is rotated, the auger flighting 50 pushes the grain along the auger trough 44 and into the grain feed tube 56 positioned on the sidewall 58 of the combine 10. In the preferred embodiment shown, the grain feed tube 56 is positioned on the right-hand side of the combine 10 (near the left end of the auger trough 44 as viewed in FIG. 2). The grain feed tube 56 connects the auger trough to the clean grain elevator 60, which is spaced outwardly from the sidewall 58 of the combine 10. In particular, the grain feed tube 56 is connected between the combine sidewall 58 and the bottom of the clean grain elevator 60, commonly referred to as the elevator boot 62. In the preferred embodiment shown, the grain feed tube 56 has a radius that is larger than the radius of the collecting auger 46 so as to allow unrestricted flow of grain through the grain feed tube 56 and into the bottom of the clean grain elevator 60. As will be explained in greater detail below in connection with the offset auger feed assembly 64, the grain in the grain feed tube 56 is pushed into the elevator boot 62 by the collecting auger 46.

Figure 3:
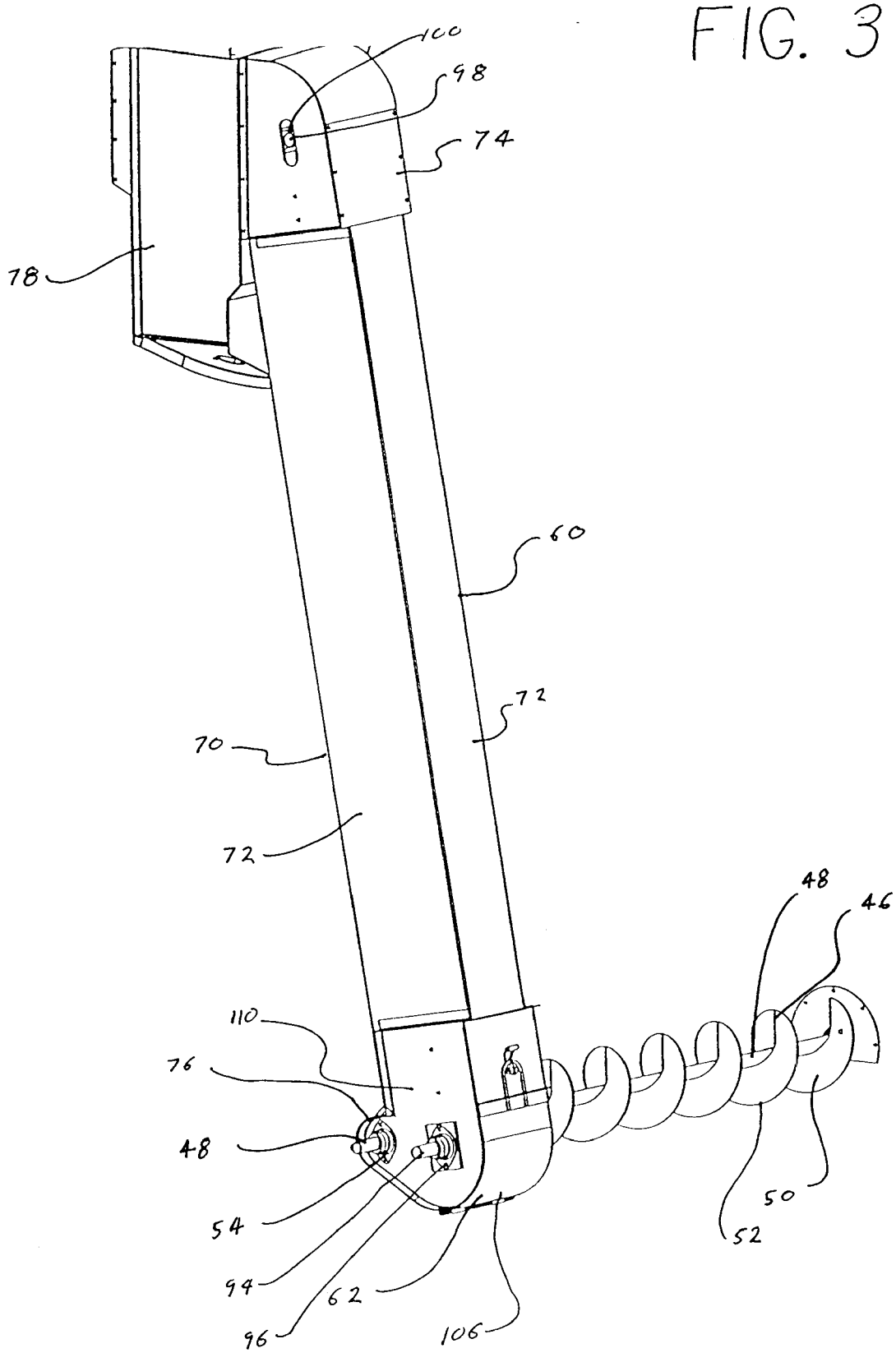
FIG. 3 is an outside perspective view of a clean grain elevator and auger assembly on which the offset auger feed of the present invention may be used.
Figure 5:
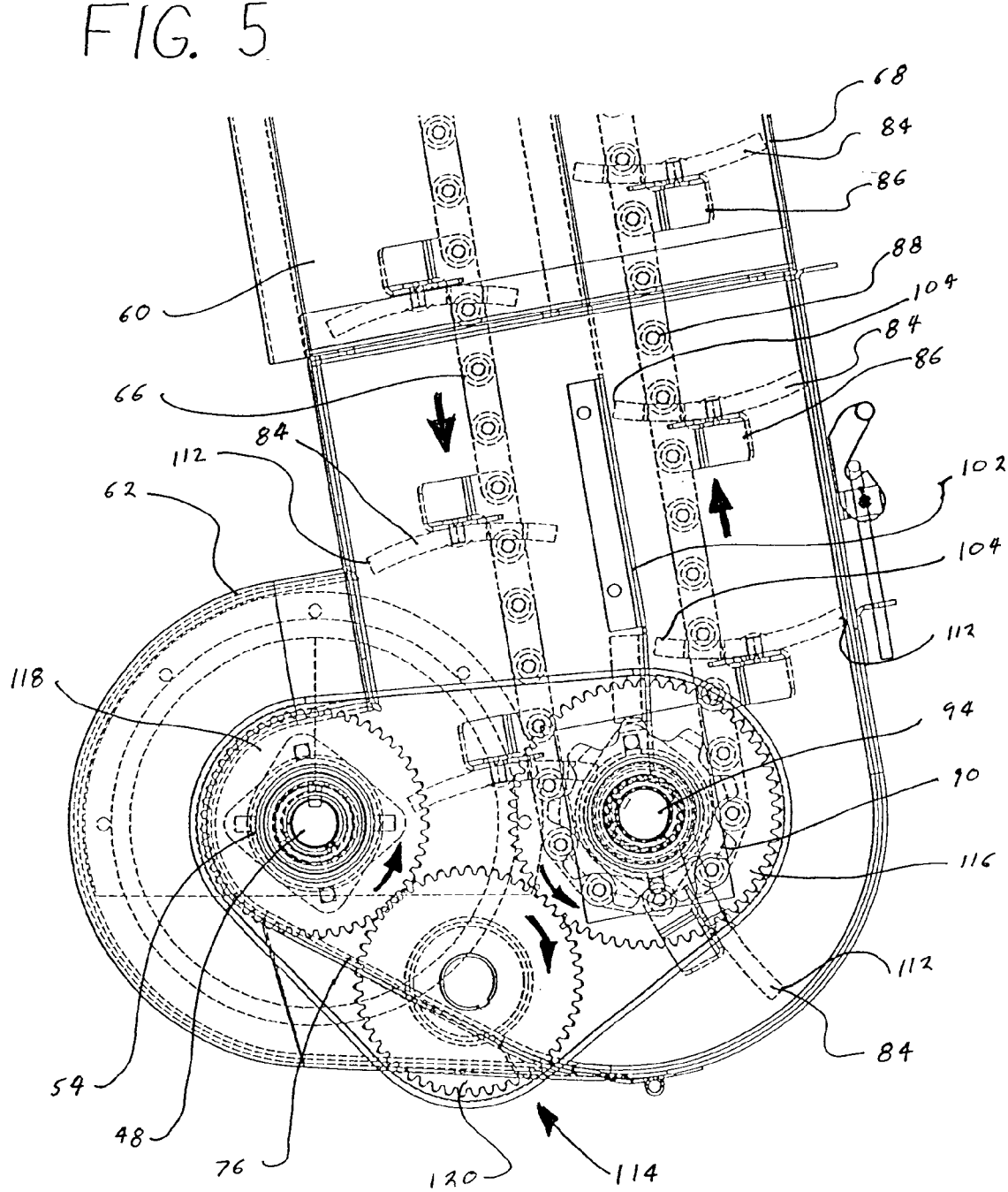
FIG. 5 is an outside view of the offset auger feed assembly shown in FIG. 3.

The clean grain elevator 60 comprises a chain and paddle assembly 66 enclosed by an elevator housing 68 (see FIG. 5). As best seen in FIGS. 2 and 3, the elevator housing 68 has a generally rectangular middle section 70 defined by four sheet metal walls 72. The elevator head 74 is connected to the top of the housing middle section 70 and comprises a plurality of walls to form an interior volume that encloses the upper portion of the chain and paddle assembly 66. The elevator boot 62 is connected to the bottom of the housing middle section 70 and comprises a plurality of walls to form an interior volume that encloses the lower portion of the chain and paddle assembly 66. Both the head 74 and the boot 62 are typically manufactured from sheet metal or rigid plastic. A portion of the elevator boot 62 extends outwardly from the elevator housing 68 to form a tapered grain feed 76. As will be explained in greater detail below, the tapered grain feed 76 is connected to the grain feed tube 56 and directs the flow of clean grain towards the bottom of the chain and paddle assembly 66.

The chain and paddle assembly 66 lifts the grain collected in the elevator boot 62 up through the elevator housing 68. As the grain reaches the head 74 of the clean grain elevator 60, it is then deposited into the storage tank auger assembly 78, where it is then transferred to the storage tank 34 (see FIG. 1). As best seen in FIG. 2, the storage tank auger assembly 78 comprises a storage tank auger 80 enclosed in a cylindrical housing 82, and functions in a similar manner as the clean grain collecting auger 46.

As best seen in FIG. 5, the chain and paddle assembly 66 comprises a series of paddles 84 connected by brackets 86 to a continuous chain 88. In the preferred embodiment shown, the paddles 84 are spaced evenly along the entire length of the continuous chain 88. The surface of the paddles 84 are perpendicular to the length of the chain 88. The chain 88 is connected between a pair of sprockets located inside the clean grain elevator housing 68. In particular, and as best seen in FIG. 5, the chain 88 is connected around a lower sprocket 90 located in the elevator boot 62, and around an upper sprocket 92 located in the elevator head 74 near the top of the clean grain elevator 60 (see FIG. 2). The lower sprocket 90 is supported on the lower sprocket shaft 94, which in turn, is supported by a pair of brackets 96 affixed to the walls of the boot 62. Likewise, the upper sprocket 92 is supported on the upper sprocket shaft 98, which in turn, is supported by a pair of brackets 100 affixed to the walls of the head 74 (see FIG. 3). The brackets 96, 100 comprise bearings that permit the lower and upper sprocket shafts 94, 98 to rotate. Alternatively, the upper and lower sprockets 90, 92 can include bearings that would permit rotation about the upper and lower sprocket shafts, 94 and 98, which could then be rigidly connected to the elevator housing 68. In the preferred embodiment, the upper sprocket 92 is keyed or fixed to the upper shaft 98, which in turn is connected to the drive unit (not shown) for the chain and paddle assembly 66. In this arrangement, the upper shaft 98 comprises a splined or hollow quill shaft that is keyed to the shaft of the drive unit.

As the continuous chain 88 is driven, any grain that has been collected in the bottom of the elevator boot 62 is scooped up by the paddles 84 and lifted up through the elevator housing 68. As best seen in FIG. 5, the interior volume of the elevator housing 68 is partitioned by a divider 102 that spans approximately from between the lower sprocket shaft 94 and the upper sprocket shaft 98. The divider 102 is positioned along the interior side or edge 104 of the upwardly moving paddles 84 so as to prevent grain on top of the paddles 84 from falling back down the through the elevator housing 68. In other words, the surface area of the paddles 84 approximates the cross-sectional area between the divider 102 and the interior surface of the forward portion of the elevator housing 68. Directional arrows have been included in FIG. 5 to show the direction of movement of the various mechanical components during normal operation of the combine 10. In the preferred embodiment shown, the paddles 84 have a slight semicircular or concave shape so that any grain sitting on the paddles 84 will tend to accumulate towards he center of the paddles 84. The concave shape of the paddles 84 also tends to prevent grain from binding between the edges of the paddles 84 and the divider 102 and the interior surface of the elevator housing 68.

Figure 4:
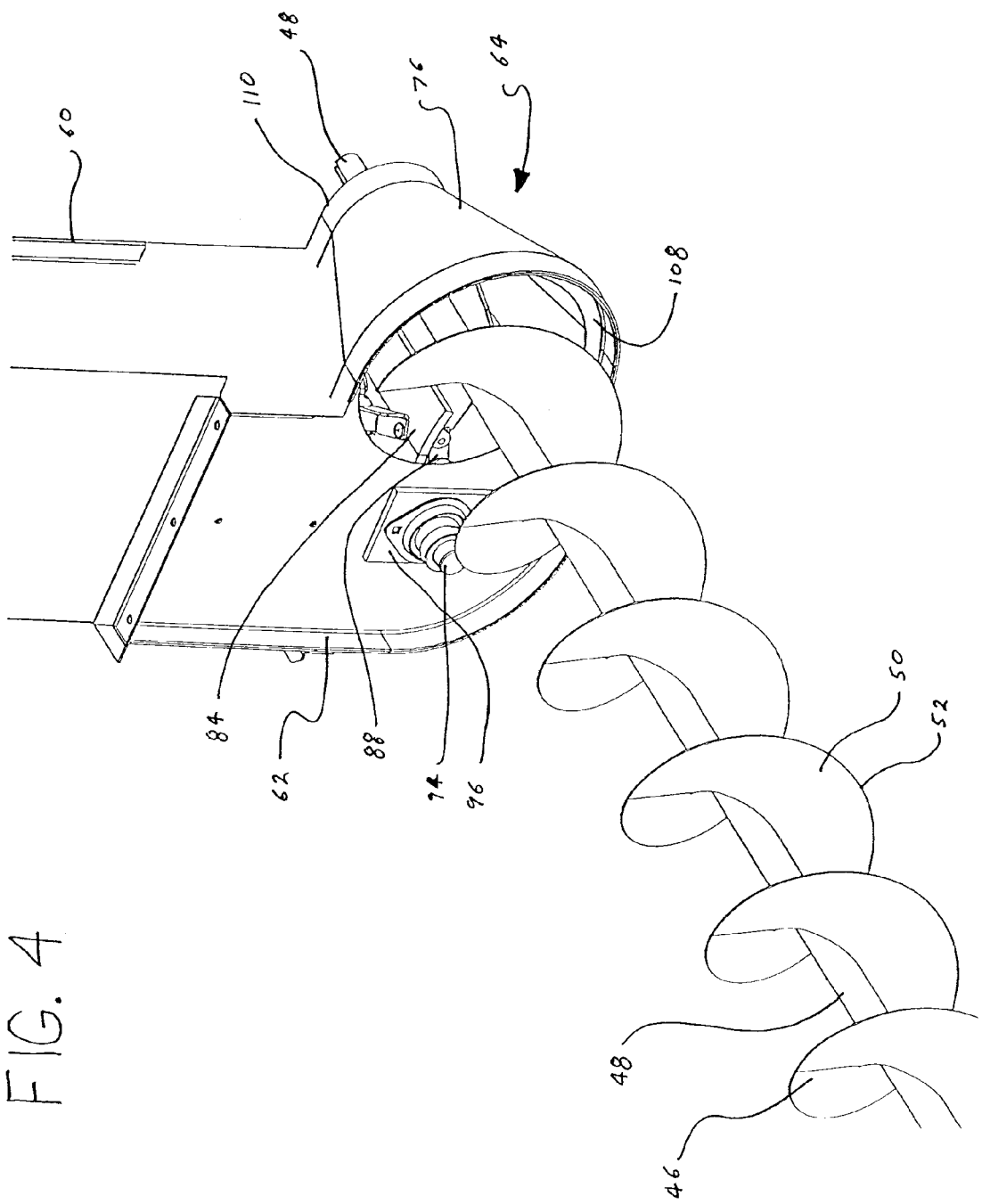
FIG. 4 is an inside perspective view of the offset auger feed assembly shown in FIG. 3.

The grain is deposited onto the paddles 84 by the offset auger feed assembly 64. As best seen in FIGS. 4 and 5, the auger shaft 48 of the collecting auger 46 extends into, and is supported by, the elevator boot housing 106. The auger shaft 48 passes through an opening formed in the interior sidewall 108 of the elevator boot housing 106. This opening is coincident with the grain feed tube 56. A bracket 54 affixed to the exterior sidewall 110 of the elevator boot housing 106 rotatably supports the end of the auger shaft 48. As best seen in FIG. 4, the auger flighting 50 does not extend into the elevator boot housing 106.

As best seen in FIG. 5, the axis of the auger shaft 48 is offset from the axis of the lower sprocket shaft 94. This offset permits the grain in the collecting auger trough 44 to be fed into the elevator boot 62 at a location adjacent to the side of the chain and paddle assembly 66. In other words, the grain is deposited adjacent to the exterior sides or edges 112 of the paddles 84. In the preferred embodiment shown, the grain is deposited into that side of the elevator in which the chain direction is toward the lower elevator sprocket 90. By offsetting the auger shaft 48 from the lower sprocket shaft 94, the lower sprocket 90 and the chain 88 do not interfere with the flow or feed of grain into the elevator boot 62.

Moreover, and as will be explained in detail below, offsetting the auger shaft 48 from the lower sprocket shaft 94 permits more uniform loading of the grain onto the paddles 84.

In the preferred embodiment shown, the axis of the auger shaft 48 is rearward of the axis of the lower sprocket shaft 94. It could also be forward, but offsetting the collecting auger 46 rearward of the clean grain elevator 60 permits the collection panel 42 to be shortened, thereby increasing its angle or pitch. Increasing the pitch of the collecting panel 42 increases the efficiency of grain movement (by gravity) into the collecting auger trough 44.

In the preferred embodiment shown, and as best seen in FIG. 5, the axis of the auger shaft 48 and the axis of the lower sprocket shaft 94 are at approximately the same vertical elevation (i.e., in approximately the same horizontal plane). This allows the overall height of the offset auger feed assembly 64 to be minimized. In other words, the bottom of the collecting auger trough 44 and the bottom of the elevator boot housing 106 can both be positioned at a minimum height above the ground, thereby allowing the angle of the collection panel 42 to be maximized.

As best seen in FIG. 4, the offset auger feed assembly 64 further comprises a tapered grain feed 76. The tapered grain feed 76 comprises a semi-conical shaped section on the rearward portion of the elevator boot housing 106 adjacent to the grain feed tube 56 (see FIG. 2). The tapered grain feed 76 directs the grain being pushed through the grain feed tube 56 by the collecting auger 46 into the bottom of the elevator boot 62. In the preferred embodiment shown, the end of the tapered grain feed 76 adjacent to the interior sidewall 108 (i.e., adjacent to the grain feed tube 56) has a radius larger than the radius of the grain feed tube 56. The radius of the tapered grain feed 76 decreases towards the exterior sidewall 110 of the elevator boot housing 106. The decreasing radius of the tapered grain feed 76 helps to distribute the grain evenly along the length of the paddles 84.

As best seen in FIG. 5, the bottom of the elevator boot housing 106 slopes downward from the tapered grain feed 76 towards the area beneath the lower sprocket 90. This downward slope allows the grain to pool beneath the chain and paddle assembly 66 where it can be scooped up by the paddles 84 as they pass under the lower sprocket 90.

As best seen in FIG. 5, the collecting auger 46 and the chain and paddle assembly 66 are drivingly coupled together by drive mechanism 114. In the preferred embodiment shown, a drive gear 116 is affixed to the lower sprocket shaft 94. Likewise, a separate drive gear 118 is affixed to the collecting auger shaft 48. An idler gear 120 is connected between the lower sprocket drive gear 116 and the auger shaft drive gear 118. The idler gear 120 causes the lower sprocket shaft 94 and the auger shaft 48 to rotate simultaneously and in the same direction (as indicated by the arrows in FIG. 5). The speed with which the lower sprocket shaft 94 rotates relative to the auger shaft 48 is determined by the ratio of the size of the lower sprocket drive gear 116 relative to the size of the auger shaft drive gear 118. In the preferred embodiment shown, all of the gears 116, 118 and 120 are located outside of the elevator boot housing 106 so that they do not interfere with the movement of grain through the inside of the elevator boot 62. The drive coupling could also be by chain or belt.

The drive mechanism 114 also comprises a power input (not shown) for rotating the collecting auger 46 and driving the chain and paddle assembly 66. Because these components are connected together by the drive mechanism 114, the power input can be connected to any one of the components. For example, the motor can be connected to either the collecting auger shaft 48 or the lower sprocket shaft 94 or to the elevator headshaft. Rotating one of these components will necessarily result in the rotation of the other components.

Of course, other mechanisms can be used to rotate the collecting auger 46 and drive the chain and paddle assembly 66. For example, the idler gear 120 can be eliminated by connecting the lower sprocket drive gear 116 directly to the auger shaft drive gear 118. With this arrangement, the collecting auger 46 would rotate in a direction opposite that of the chain and paddle assembly 66. This may necessitate the use of a different type of auger (i.e., with reversed auger flighting). Another alternative would be to use separate motors to independently rotate the collecting auger 46 and drive the chain and paddle assembly 66.

Figure 6:
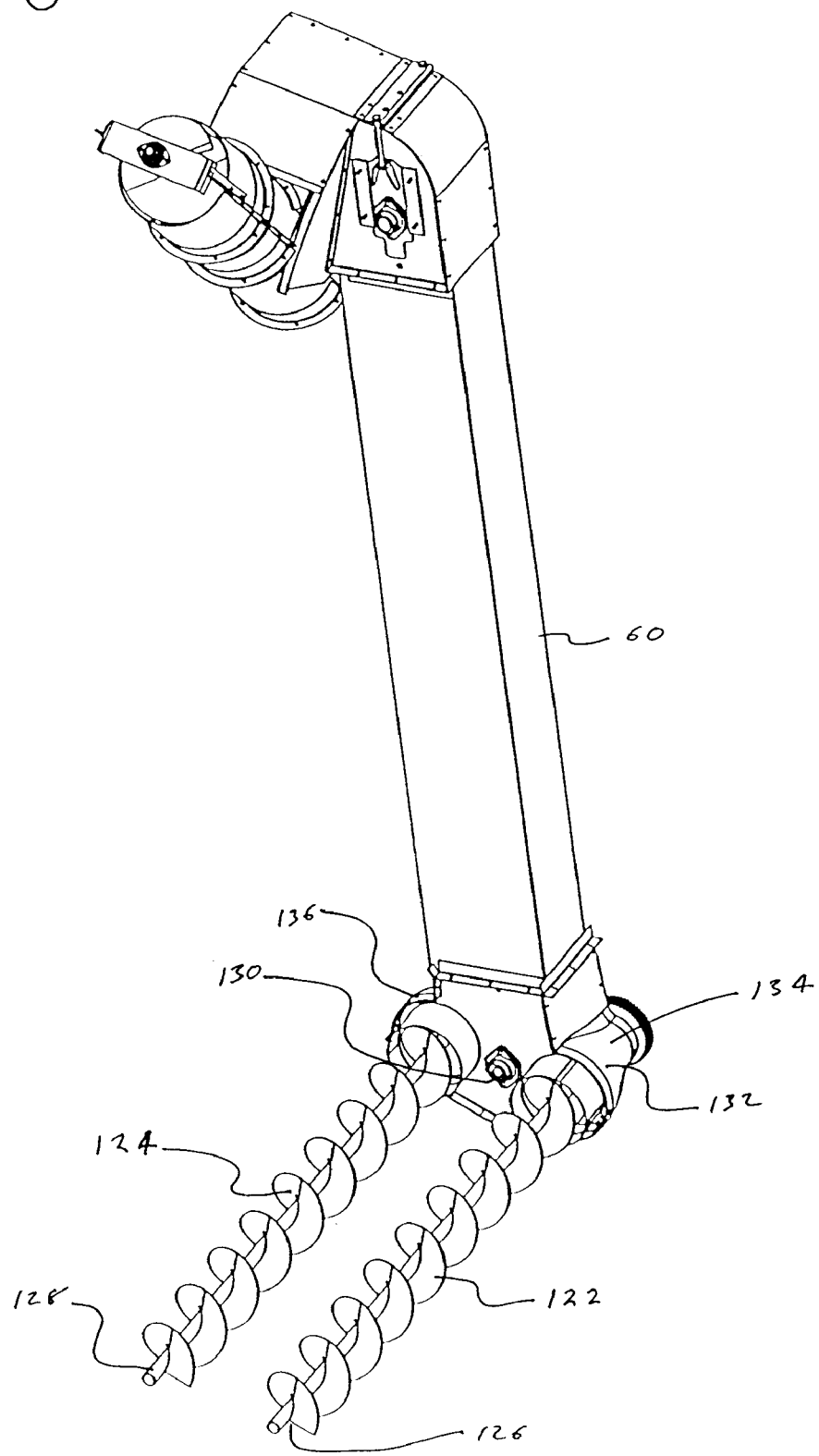
FIG. 6 is an inside perspective view of an alternative embodiment of the present invention and shows a clean grain elevator having dual offset auger feeds.
Figure 7:
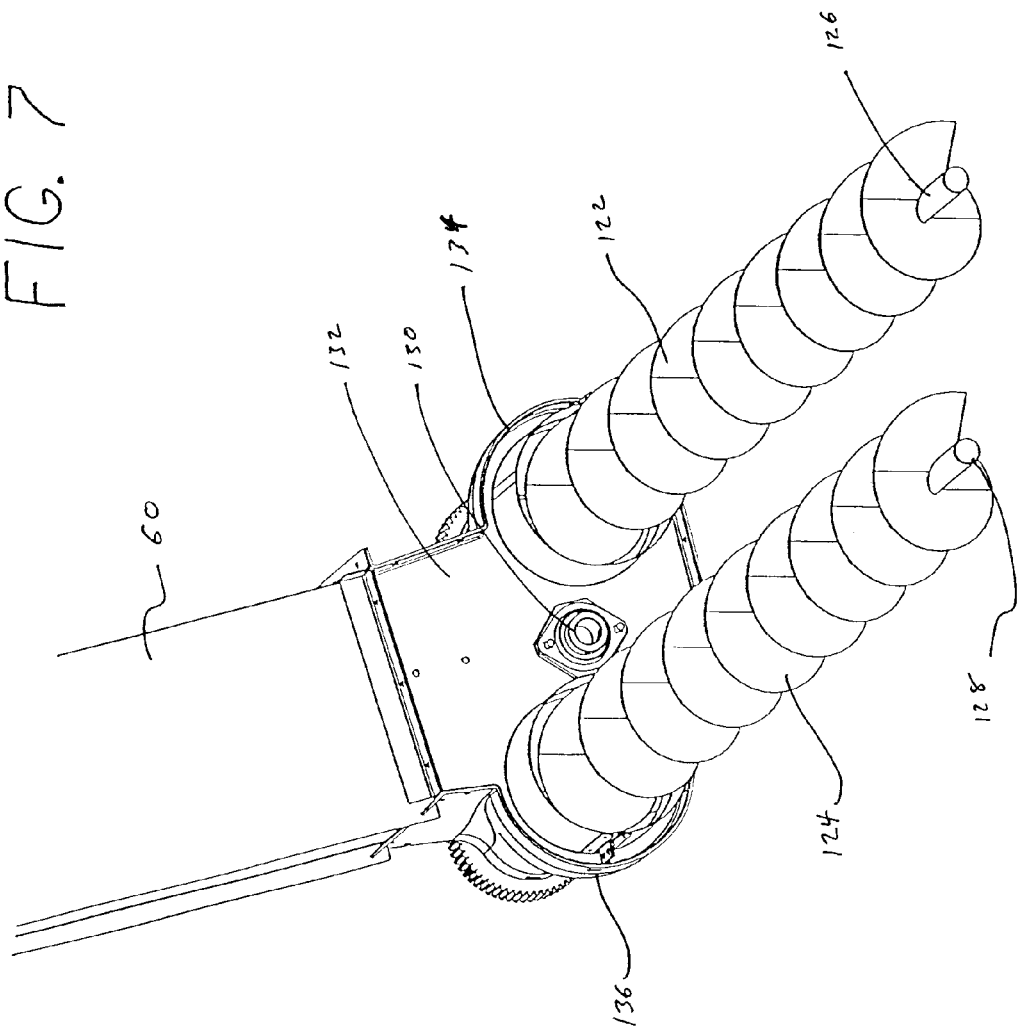
FIG. 7 is an inside perspective view of the dual offset auger feed assembly shown in FIG. 6.
Figure 8:
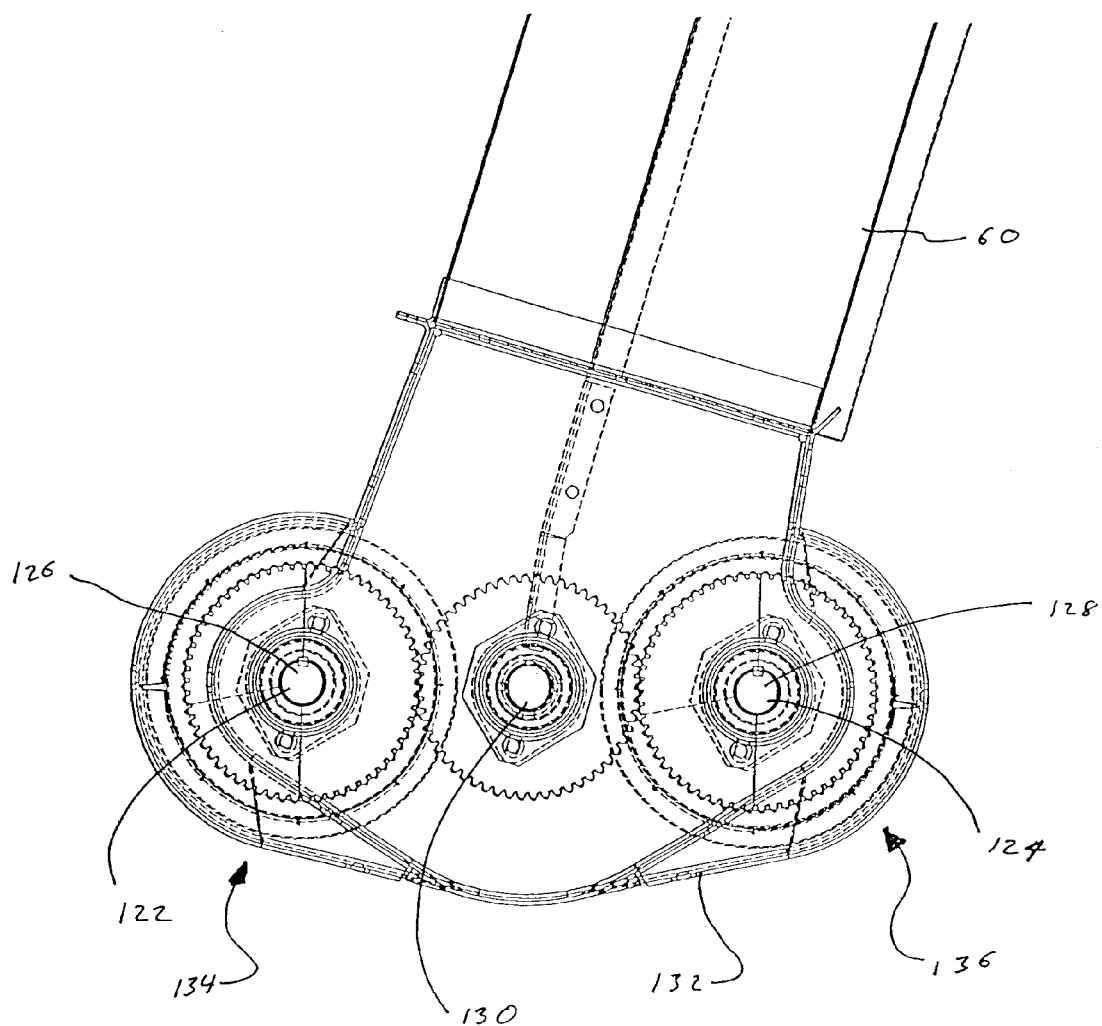
FIG. 8 is an outside view of the dual offset auger feed assembly shown in FIG. 6.

An alternative embodiment of the invention is shown in FIGS. 6–8. This embodiment utilizes a pair of offset collecting augers 122 and 124. One of the augers 122 is positioned rearward of the clean grain elevator 60. The second auger 124 is position forward of the clean grain elevator 60. As best seen in FIG. 8, shafts 126, 128 of these augers 122, 124 are each offset from the lower sprocket shaft 130 of the chain and paddle assembly (inside clean grain elevator 60). Accordingly, the elevator boot 132 comprises two separate offset auger feed assemblies 134, 136, one for each collecting auger 122, 124. The design and function of each offset auger feed assembly 134, 136 is similar to the design and function of the single offset auger feed assembly 64 described above in connection with the preferred embodiment. Other components of the grain elevator are likewise similar to those described above.

A third auger (not shown) may also be included between the two offset augers 122, 124. This third auger would be connected to the lower sprocket shaft 130 and would only extend a short distance along the length of the two main offset augers 122, 124. The function of this third auger would be to prevent the pooling of grain that might occur against the sidewall of the combine between the two main offset augers 122, 124.

The use of dual offset augers 122, 124 allows smaller diameter augers to be used to collect and move the clean grain into the clean grain elevator 60. This may improve the geometry (i.e., increase the angle) of the clean grain collecting panel 42 beneath the cleaning sieves 40 by allowing the leading edge of the collecting panel 42 to be lowered.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All modifications that come within the meaning and range of equivalency of the claims are to be embraced within their scope.

What is claimed is:

1. An offset auger feed assembly for use with a grain harvesting combine, wherein said offset auger feed assembly comprises:
    a) a grain elevator for lifting grain into a storage tank on said combine, said grain elevator comprising a plurality of paddles connected to a continuous chain, said continuous chain being supported by an upper sprocket and a lower sprocket, said upper sprocket being supported by an upper sprocket shaft connected to a head portion of said grain elevator, said lower sprocket being supported by a lower sprocket shaft connected to a boot portion of the grain elevator, said boot portion comprising an interior side and an exterior side; and
    b) an auger assembly for collecting and moving said grain into said clean grain elevator, said auger assembly comprising an auger positioned in a trough, said trough being connected to the interior side of said boot portion, said auger comprising auger flighting spirally affixed about a centrally located auger shaft, said auger shaft projecting through an opening in the interior side of said boot portion and comprising an end rotatably supported by said boot portion of said grain elevator, wherein said auger shaft is offset from said lower sprocket shaft, and further wherein said boot portion comprises a tapered area between said interior side and said exterior side for directing the flow of grain towards said paddles, said tapered area being formed by a wall connected between said interior side and said exterior side, said wall being disposed at an angle relative to said auger shaft.

2. The offset auger feed assembly of claim 1 wherein said wall comprises a conical shape, and wherein a portion of the interior side that is connected to said wall forms a radius that is larger than a radius formed by a portion of the exterior side that is connected to said wall.

3. The offset auger feed assembly of claim 2 wherein a portion of said trough that is connected to the interior side of said boot portion comprises a grain feed tube, wherein said grain feed tube has a tubular shape with a radius that is smaller the radius of the portion of the interior side that is connected to the wall.

4. The offset auger feed assembly of claim 1 wherein a portion of said trough that is connected to the interior side of said boot portion comprises a grain feed tube, wherein said grain feed tube extends from said boot portion to an exterior surface of said grain harvesting combine, and said auger flighting extends through said grain feed tube.

5. The offset auger feed assembly of claim 1 wherein said auger shaft has an axis of rotation that is parallel to an axis of rotation of said lower sprocket shaft.

6. The offset auger feed assembly of claim 5 wherein the axis of rotation of said auger shaft and the axis of rotation of said lower sprocket shaft are located in approximately the same horizontal plane.

7. The offset auger feed assembly of claim 5 wherein the axis of rotation of said auger shaft is on the side of the elevator in which the direction of travel of the elevator chain is toward said lower sprocket.

8. The offset auger feed assembly of claim 5 wherein the axis of rotation of said auger shaft is rearward of the axis of rotation of said lower sprocket shaft.

9. The offset auger feed assembly of claim 1 wherein a first gear is connected to the lower sprocket and a second gear is connected to the auger shaft, said first gear being connected to said second gear so that the lower sprocket and the auger shaft are rotated simultaneously.

10. The offset auger feed assembly of claim 7 wherein an idler gear is connected between said first gear and said second gear so that the lower sprocket and the auger shaft are rotated in the same direction.

11. The offset auger feed assembly of claim 1 the auger and the lower sprocket are drivingly coupled by a chain and sprockets or by a belt and pulleys.

12. The offset auger feed assembly of claim 1 wherein said auger assembly comprises two separate augers, each said auger comprising an auger shaft rotatably supported by the boot portion of said grain elevator, wherein each auger shaft is offset from said lower sprocket shaft, and wherein the boot portion adjacent to each said auger shaft comprises a tapered area between said interior side and said exterior side for directing the flow of grain from each of said augers towards said paddles.

13. The offset auger feed assembly of claim 10 wherein the lower sprocket is connected to each of the auger shafts by one or more gears so that the lower sprocket and each of the auger shafts are rotated simultaneously.

14. An auger and grain elevator assembly for use with a grain harvesting combine, wherein said auger and grain elevator assembly comprises:
    a) a grain elevator comprising a housing having a head portion, a middle portion, and a boot portion, said boot portion comprising an interior side and an exterior side;
    b) a chain and paddle assembly enclosed in said housing, said chain and paddle assembly comprising a plurality of paddles connected to a continuous chain, said continuous chain being supported by an upper sprocket and a lower sprocket, said upper sprocket being supported by a upper sprocket shaft connected to the head portion of said housing, said lower sprocket being supported by a lower sprocket shaft connected to the interior side and the exterior side of the boot portion of the housing; and
    c) an auger assembly connected to the boot portion of the housing, said auger assembly comprising an auger positioned in a trough, said trough being connected to the interior side of said boot portion, said auger projecting through an opening in the interior side of said boot portion and comprising auger flighting spirally affixed about a centrally located auger shaft, said auger shaft comprising an end rotatably supported by the exterior side of the boot portion of the housing, wherein said auger shaft is offset from said lower sprocket shaft, and further wherein said boot portion comprises a tapered area between said interior side and said exterior side for directing the flow of grain towards said paddles, said tapered area being formed by a wall connected between said interior side and said exterior side, said wall being disposed at an angle relative to said auger shaft.

15. The auger and grain elevator assembly of claim 14 wherein said wall comprises a conical shape, and wherein a portion of the interior side that is connected to said wall forms a radius that is larger than a radius formed by a portion of the exterior side that is connected to said wall.

16. The offset auger feed assembly of claim 15 wherein a portion of said trough that is connected to the interior side of said boot portion comprises a grain feed tube, wherein said grain feed tube has a tubular shape with a radius that is smaller the radius of the portion of the interior side that is connected to the wall.

17. The offset auger feed assembly of claim 16 wherein a portion of said trough that is connected to the interior side of said boot portion comprises a grain feed tube, wherein said grain feed tube extends from said boot portion to an exterior surface of said grain harvesting combine, and said auger flighting extends through said grain feed tube.

18. The auger and grain elevator assembly of claim 16 wherein said auger shaft has an axis of rotation that is parallel to an axis of rotation of said lower sprocket shaft.

19. The auger and grain elevator assembly of claim 18 wherein the axis of rotation of said auger shaft and the axis of rotation of said lower sprocket shaft are located in approximately the same horizontal plane.

20. The auger and grain elevator assembly of claim 16 wherein the axis of rotation of said auger shaft is on the side of the elevator in which the direction of travel of the elevator chain is toward said lower sprocket.

21. The auger and grain elevator assembly of claim 18 wherein the axis of rotation of said auger shaft is rearward of the axis of rotation of said lower sprocket shaft.

22. The auger and grain elevator assembly of claim 16 wherein a first gear is connected to the lower sprocket and a second gear is connected to the auger shaft, said first gear being connected to said second gear so that the lower sprocket and the auger shaft are rotated simultaneously.

23. The auger and grain elevator assembly of claim 16 wherein the auger and the lower sprocket of the elevator are drivingly coupled by a chain and sprockets or by a belt and pulleys.

24. The auger and grain elevator assembly of claim 22 wherein an idler gear is connected between said first gear and said second gear so that the lower sprocket and the auger shaft are rotated in the same direction.

25. The auger and grain elevator assembly of claim 16 wherein said auger assembly comprises two separate augers, each said auger comprising an auger shaft rotatably supported by the boot portion of said grain elevator, wherein each auger shaft is offset from said lower sprocket shaft, and wherein the boot portion adjacent to each said auger shaft comprises a tapered area between said interior side and said exterior side for directing the flow of grain from each of said augers towards said paddles.

26. The auger and grain elevator assembly of claim 25 wherein the lower sprocket is connected to each of the auger shafts by one or more gears so that the lower sprocket and each of the auger shafts are rotated simultaneously.

27. A combine for harvesting grain comprising:
a) one or more sieves for cleaning grain harvested by said combine, said sieves comprising a plurality of openings which permit said clean grain to fall through said sieves;
b) a panel positioned beneath said sieves for collecting the clean grain falling through said sieves, said panel having a lower edge towards which the clean grain on said panel will tend to travel under the influence of gravity;
c) a trough position along the lower edge of said panel for collecting the clean grain on said panel;
d) an auger positioned in said trough for moving the clean grain collected in said trough along the length of said trough, said auger comprising a spiral blade affixed about an auger shaft, said auger shaft having an axis of rotation about which said auger rotates; and
e) a grain elevator for lifting the clean grain upwardly whereby it is deposited in a storage tank on said combine, said grain elevator comprising a housing having a head and a boot, said boot being configured so as to receive the clean grain in said auger trough, said grain elevator further comprising a chain and paddle assembly within said housing, said chain and paddle assembly being supported by an upper sprocket rotatably connected to the head of said housing and a lower sprocket rotatably connected to the boot of said housing, said lower sprocket having an axis of rotation that is offset from the axis of rotation of said auger shaft, wherein said boot comprises an interior side and an exterior side, said interior side being connected to said trough, with a portion of said auger shaft projecting through an opening in said interior side and connecting to said exterior side of said boot, and wherein said boot portion comprises a tapered area between said interior side and said exterior side for directing the flow of grain towards said chain and paddle assembly, said tapered area being formed by a wall connected between said interior side and said exterior side, said wall being disposed at an angle relative to said auger shaft.

28. The combine of claim 27 wherein said wall comprises a conical shape, and wherein a portion of the interior side that is connected to said wall forms a radius that is larger than a radius formed by a portion of the exterior side that is connected to said wall.

29. The offset auger feed assembly of claim 28 wherein a portion of said trough that is connected to the interior side of said boot portion comprises a grain feed tube, wherein said grain feed tube has a tubular shape with a radius that is smaller the radius of the portion of the interior side that is connected to the wall.

30. The offset auger feed assembly of claim 27 wherein a portion of said trough that is connected to the interior side of said boot portion comprises a grain feed tube, wherein said grain feed tube extends from said boot portion to an exterior surface of said grain harvesting combine, and said auger flighting extends through said grain feed tube.

31. The combine of claim 27 wherein the axis of rotation of said auger shaft is parallel to the axis of rotation of said lower sprocket shaft.

32. The combine of claim 31 wherein the axis of rotation of said auger shaft and the axis of rotation of said lower sprocket shaft are located in approximately the same horizontal plane.

33. The combine of claim 31 wherein the axis of rotation of said auger shaft is rearward of the axis of rotation of said lower sprocket shaft.

34. The combine of claim 23 wherein the auger and the lower sprocket of the elevator are drivingly coupled by a chain and sprockets or by a belt and pulleys.

35. The combine of claim 23 wherein a first gear is connected to the lower sprocket and a second gear is connected to the auger shaft, said first gear being connected to said second gear so that the lower sprocket and the auger shaft are rotated simultaneously.

36. The combine of claim 35 wherein an idler gear is connected between said first gear and said second gear so that the lower sprocket and the auger shaft are rotated in the same direction.

37. The combine of claim 27 further comprising a second auger connected to the boot of said housing, said second auger comprising an auger shaft having an axis of rotation that is offset from the axis of rotation of said lower sprocket, wherein the boot portion adjacent to said second auger comprises a tapered area between said interior side and said exterior side for directing the flow of grain from said second auger towards said chain and paddle assembly.

38. The combine of claim 37 wherein the lower sprocket is connected to each of the auger shafts by one or more gears so that the lower sprocket and each of the auger shafts are rotated simultaneously.

39. An auger and grain elevator assembly for use with a grain harvesting combine, wherein said auger and grain elevator assembly comprises:

a) a grain elevator comprising a housing having a head portion, a middle portion, and a boot portion, said boot portion comprising an interior volume defined by an interior side and a spaced apart exterior side, said interior side comprising an open portion, said boot portion further comprising a tapered grain feed formed by a conically shaped end wall connected between said interior side and said exterior side, said tapered grain feed being aligned with said open portion of said interior side, said tapered grain feed having a cross-sectional area that decreases from the interior side to the exterior side;

b) a chain and paddle assembly enclosed in said housing, said chain and paddle assembly comprising a plurality of spaced apart paddles connected to a continuous chain, said continuous chain being supported by an upper sprocket and a lower sprocket, said upper sprocket being supported by a upper sprocket shaft connected to the head portion of said housing, said lower sprocket having an axis of rotation and being supported by a lower sprocket shaft connected between the interior side and the exterior side of said boot portion, said lower sprocket shaft being disposed adjacent to said tapered grain feed; and c) an auger assembly connected to the boot portion of the housing, said auger assembly comprising an auger trough connected to the interior side of said boot portion and aligned with the open portion of said interior side and said tapered grain feed, said auger assembly further comprising an auger positioned in said auger trough, said auger comprising auger flighting spirally affixed about a centrally located auger shaft, said auger shaft extending through the open portion of the interior side and the tapered grain feed, and connecting to the exterior side of said boot portion, wherein said auger shaft comprises an axis of rotation that is parallel to and offset from said axis of rotation of said lower sprocket.

40. The offset auger feed assembly of claim 39 wherein a portion of said auger trough that is connected to the interior side of said boot portion comprises a grain feed tube, wherein said grain feed tube has a tubular shape with a cross-sectional area that is smaller than the cross-sectional area of the tapered grain feed at the interior side of said boot portion.

* * * * *

UNITED STATES PATENT AND TRADEMARK OFFICE
CERTIFICATE OF CORRECTION

PATENT NO.   : 6,350,197 B1  Page 1 of 1
DATED        : February 26, 2002
INVENTOR(S)  : William L. Cooksey et al.

It is certified that error appears in the above-identified patent and that said Letters Patent is hereby corrected as shown below:

Title page,
Item [56], References Cited, U.S. PATENT DOCUMENTS, delete "1/1967" and substitute -- 11/1967 -- in its place.

Column 9,
Line 44, delete "smaller the" and substitute -- smaller than the -- in its place.

Column 10,
Line 6, delete "claim 7" and substitute -- claim 9 -- in its place.
Line 23, delete "claim 10" and substitute -- claim 12 -- in its place.
Line 39, delete "a upper" and substitute -- an upper -- in its place.

Column 11,
Line 3, delete "smaller the" and substitute -- smaller than the -- in its place.
Lines 5, 12, 19, 27, 33 and 41, delete "claim 16" and substitute -- claim 14 -- in its place.

Column 12,
Lines 57 and 61, delete "claim 23" and substitute -- claim 27 -- in its place.

Column 14,
Line 3, delete "a upper" and substitute -- an upper -- in its place.

Signed and Sealed this

Third Day of December, 2002

JAMES E. ROGAN
*Director of the United States Patent and Trademark Office*